(12) United States Patent
Morimoto et al.

(10) Patent No.: US 7,794,864 B2
(45) Date of Patent: Sep. 14, 2010

(54) FUEL CELL MODULE, FUEL CELL, AND METHOD OF MANUFACTURING FUEL CELL MODULE

(75) Inventors: Takashi Morimoto, Osaka (JP); Hiroki Kusakabe, Osaka (JP); Toshihiro Matsumoto, Osaka (JP); Norihiko Kawabata, Osaka (JP); Mitsuo Yoshimura, Kyoto (JP)

(73) Assignee: Panasonic Corporation, Osaka (JP)

( * ) Notice: Subject to any disclaimer, the term of this patent is extended or adjusted under 35 U.S.C. 154(b) by 30 days.

(21) Appl. No.: 12/293,436

(22) PCT Filed: Mar. 13, 2008

(86) PCT No.: PCT/JP2008/000558
§ 371 (c)(1),
(2), (4) Date: Sep. 18, 2008

(87) PCT Pub. No.: WO2008/129779
PCT Pub. Date: Oct. 30, 2008

(65) Prior Publication Data
US 2009/0155661 A1    Jun. 18, 2009

(30) Foreign Application Priority Data
Apr. 13, 2007    (JP) .............................. 2007-105376

(51) Int. Cl.
*H01M 2/08*    (2006.01)

(52) U.S. Cl. .......................................... 429/36; 429/34

(58) Field of Classification Search ........................ None
See application file for complete search history.

(56) References Cited

U.S. PATENT DOCUMENTS

| 5,264,299 | A | * | 11/1993 | Krasij et al. | 429/30 |
| 5,464,700 | A |   | 11/1995 | Steck et al. | 429/30 |
| 6,531,236 | B1 | * | 3/2003 | Hatoh et al. | 429/34 |
| 6,610,435 | B1 |   | 8/2003 | Maruyama et al. | 429/34 |
| 6,716,550 | B1 | * | 4/2004 | Kirby | 429/35 |

(Continued)

FOREIGN PATENT DOCUMENTS

EP    1 465 272 A2    10/2004

(Continued)

OTHER PUBLICATIONS

Machine translation of JP 2001-336640.*

(Continued)

*Primary Examiner*—Patrick Ryan
*Assistant Examiner*—Cynthia Lee
(74) *Attorney, Agent, or Firm*—Steptoe & Johnson LLP (57) ABSTRACT

For the purpose of providing a fuel cell module having a small number of molding processes and favorable productivity, the edge of a polymer electrolyte membrane (44) exposed at the outer periphery of an electrode section, which is formed by providing an anode electrode (46a) and a cathode electrode (46b) on the polymer electrolyte membrane (44), is placed on the upper surface of one frame (47a); and another frame (47c) is molded on the upper surface of the one frame (47a) by injecting a resin material having a smaller Young's modulus than the one frame (47a), and a seal section (49) made from the same material as the other frame (47c) is simultaneously molded on the lower surface of the other frame (47a).

4 Claims, 9 Drawing Sheets

U.S. PATENT DOCUMENTS

| | | | |
|---|---|---|---|
| 2004/0096730 A1* | 5/2004 | Kuroki et al. | 429/44 |
| 2007/0072045 A1 | 3/2007 | Haufe et al. | 429/35 |

FOREIGN PATENT DOCUMENTS

| | | |
|---|---|---|
| JP | 2001-336640 | 12/2001 |
| JP | 2003-123799 | 4/2003 |
| JP | 2004-311254 | 11/2004 |
| JP | 2006-260910 | 9/2006 |
| JP | 2007-95669 | 4/2007 |
| JP | 4096027 | 3/2008 |
| JP | 4216904 | 11/2008 |
| WO | WO 2007/026797 | 3/2007 |
| WO | WO 2008/001755 | 6/2007 |

OTHER PUBLICATIONS

Definition of modulus of elasticity from Hawley's Condensed Chemical Dictionary, 14 d., 2002, John Wiley & Sons, Inc., retrived from www.knovel.com on Dec. 6, 2009.*
Partial translation of JP 2001-336640.*

* cited by examiner

FUEL CELL MODULE, FUEL CELL, AND METHOD OF MANUFACTURING FUEL CELL MODULE

The present application is based on International Application PCT/JP2008/000558 filed Mar. 13, 2008, which claims priority to Japanese Patent Application No. 2007-105376, filed Apr. 13, 2007, the entire contents of which are hereby incorporated by reference.

TECHNICAL FIELD

The present invention relates to a fuel cell module that is used as a component in a polymer electrolyte fuel cell (PEFC) or the like, and more particularly, to an electrolyte membrane electrode assembly of such a fuel cell module.

BACKGROUND ART

Figure 7:
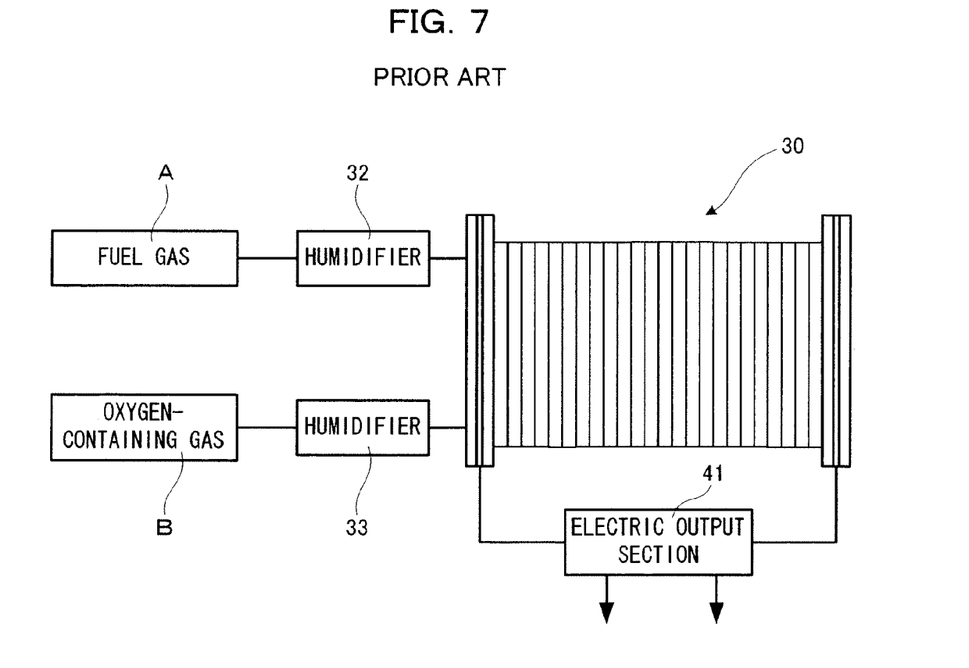
FIG. 7 is a configuration diagram of a polymer electrolyte fuel cell.

A polymer electrolyte fuel cell is configured as shown in FIG. 7.

A stack 30 has a layered structure in which a plurality of fuel cell modules is connected in series. A fuel gas A and an oxygen-containing gas B are supplied to the stack 30 from the outside. Electric power, heat, and water are simultaneously created by inducing an electrochemical reaction of the gases. Electric power generated at the stack 30 is retrieved via an electric output section 41.

Figure 8:
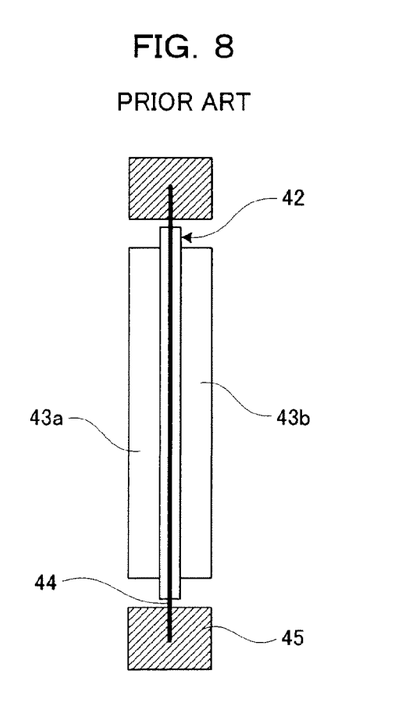
FIG. 8 is a cross-sectional view of a general fuel cell module.

Each fuel cell module of the stack 30 is formed by centrally-placing and sandwiching an electrolyte membrane electrode assembly 42 between two separators 43a and 43b, as shown FIG. 8. As also shown in FIG. 9E, the electrolyte membrane electrode assembly 42 is configured such that the outer periphery of a polymer electrolyte membrane 44 is supported by a frame body 45. An anode electrode (fuel electrode) 46a is provided on one surface of the polymer electrolyte membrane 44 and a cathode electrode (oxidant electrode) 46b on another surface of the polymer electrolyte membrane 44. A channel for the fuel gas A is formed between the separator 43a and the anode electrode (fuel electrode) 46a. A channel for the oxygen-containing gas B is formed between the separator 43b and the cathode electrode (oxidant electrode) 46b.

The electrolyte membrane electrode assembly 42 is manufactured through processes shown in FIGS. 9A to 9E as described in Patent Document 1 and the like.

Figure 9A:
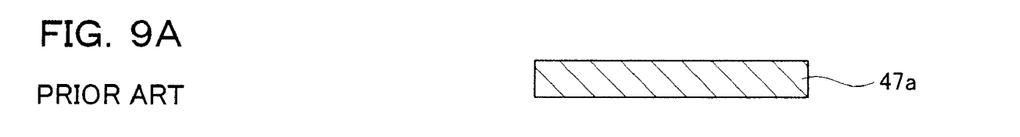
FIGS. 9A to 9E are manufacturing process diagrams of a general fuel cell module.

In a frame body primary molding process shown in FIG. 9A, one frame 47a to become a part of the frame body 45 is molded.

Figure 9B:
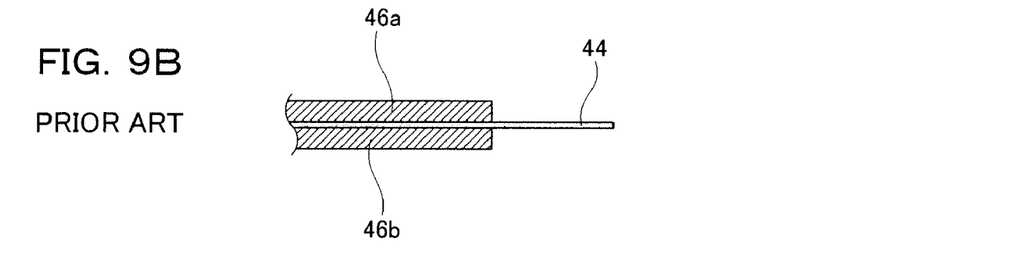

In FIG. 9B, an electrode section is formed by providing the anode electrode (fuel electrode) 46a and the cathode electrode (oxidant electrode) 46b on the polymer electrolyte membrane 44.

Figure 9C:
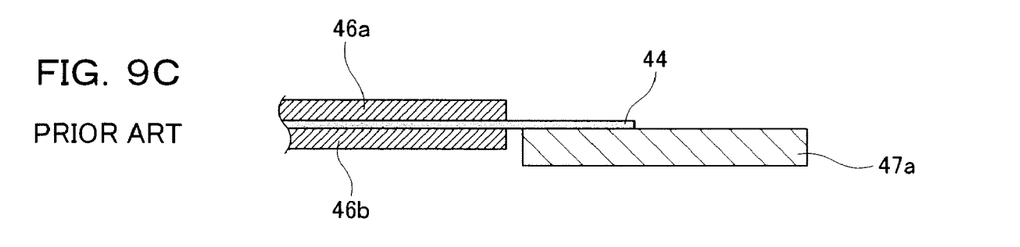
Figure 9D:
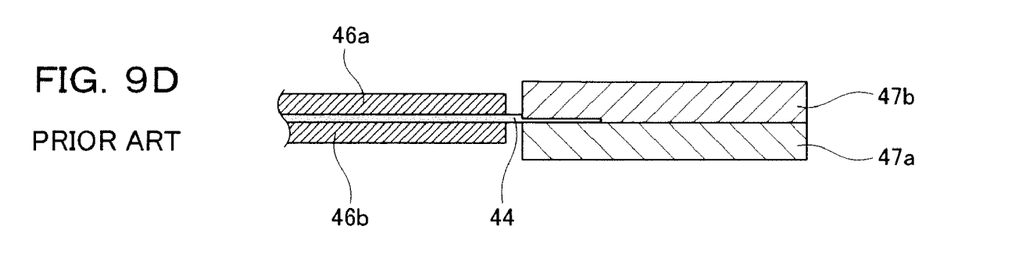
Figure 9E:
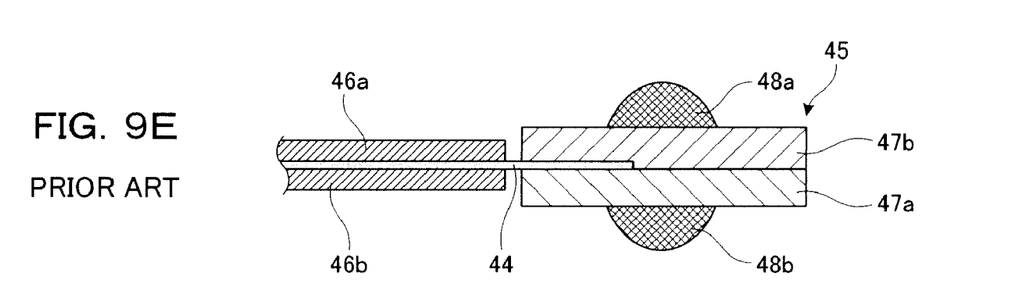

In FIGS. 9C and 9D, the edge of the polymer electrolyte membrane 44 exposed to the outer periphery of the electrode section is placed on the upper surface of the one frame 47a, a resin material is injected to mold another frame 47b to become part of the frame body 45, and the polymer electrolyte membrane 44 is held by the one frame 47a and the other frame 47b.

In FIG. 9E, a resin material having a lower Young's modulus than the frames 47a and 47b is injected to mold protrusions 48a and 48b which abut and seal the adjacent fuel cell module on outer surfaces of the one frame 47a and the other frame 47b.

In addition, Patent Documents 2 and 6 disclose setting an elastic modulus of a frame body covering a peripheral edge portion of an polymer electrolyte membrane to a range from 2000 MPa to 2000000 MPa, both inclusive, and setting an elastic modulus of an elastic body provided between the frame body and a separator to 200 MPa or less.

Furthermore, Patent Document 3 discloses an electrolyte membrane electrode assembly provided with gaskets on both surfaces of a peripheral edge portion of a polymer electrolyte membrane. Protrusions for sealing are provided on the gaskets.

Moreover, Patent Document 4 discloses a thin-film carrier gasket in which seals that are elastic bodies are integrally formed. Seals with different degrees of hardness or made from different materials are provided on front and rear surfaces of the carrier.

In addition, Patent Document 5 discloses a configuration in which seal members made from materials with different elastic moduli and formed on a peripheral edge portion of a polymer electrolyte membrane are stacked in two layers, whereby an elastic modulus of the seal member (separator side) formed above the seal member on the polymer electrolyte membrane-side is set lower than that of the seal member on the polymer electrolyte membrane-side so as to absorb the roughness of the separator.

Furthermore, in Patent Document 7, an electrolyte membrane electrode assembly is composed of a polymer electrolyte membrane and electrodes holding the polymer electrolyte membrane, wherein a peripheral edge portion is enclosed by a frame made up of an elastic body and a sealing lip is formed on the frame.

Moreover, Patent Documents 8 and 9 disclose stacking seal members made up of materials with different elastic moduli in two layers, wherein the elastic modulus of the seal member of a polymer electrolyte membrane is set higher than the elastic modulus of the separator-side seal member.

Patent Document 1: Japanese Patent Laid-Open No. 2004-311254
Patent Document 2: Japanese Patent Laid-Open No. 2004-319461
Patent Document 3: Japanese Patent Laid-Open No. 2007-95669
Patent Document 4: Japanese Patent Laid-Open No. 2001-336640
Patent Document 5: Japanese Patent Laid-Open No. 2000-182639
Patent Document 6: US Patent No. 2004/0234831
Patent Document 7: US Patent No. 2007/0072045
Patent Document 8: US Patent No. 2002/0064703
Patent Document 9: US Patent No. 2002/0150810

As shown in FIGS. 9A to 9E, since the large number of molding processes results in inferior workability, a reduction in the number of molding processes is currently being demanded.

Figure 10A:
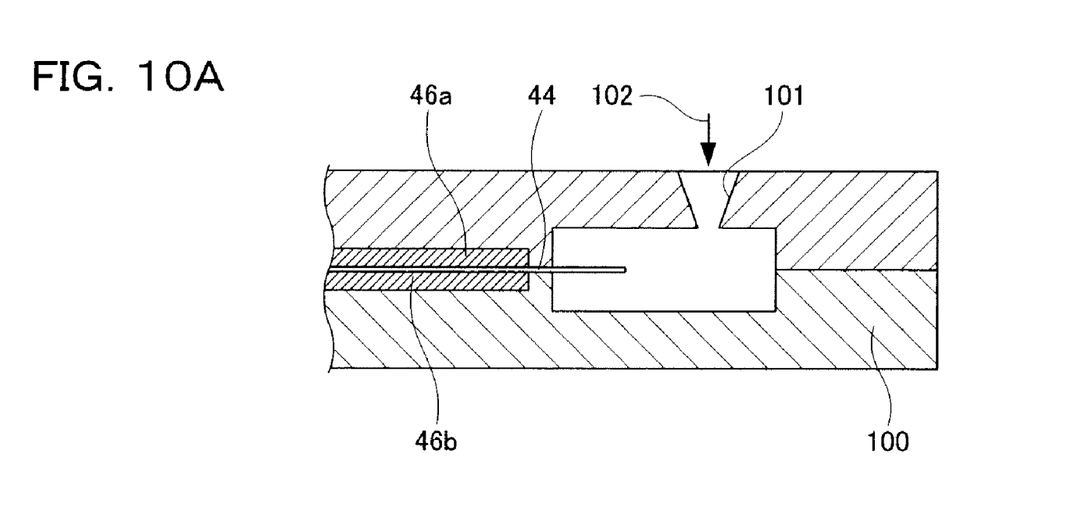
FIGS. 10A and 10B are manufacturing process diagrams of a fuel cell module that is a comparative example.
Figure 10B:
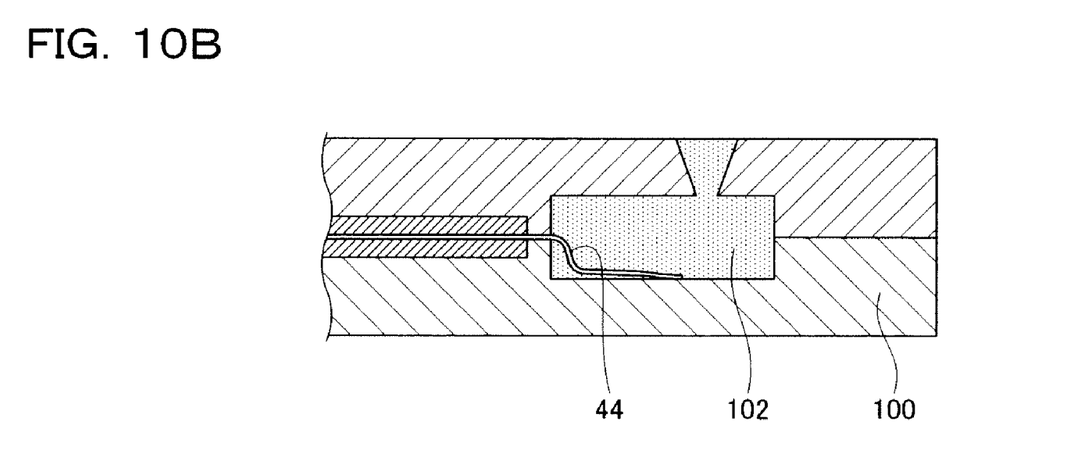

In this light, while the frame body 45 can conceivably be molded in a single molding process by setting an electrode section on a die 100 and injecting a resin material 102 from a gate 101 as shown in FIG. 10A, since the polymer electrolyte membrane 44 is a thin, flexible material, the edge of the polymer electrolyte membrane 44 becomes deflected and deformed due to the pressure applied by a resin as shown in FIG. 10B during resin injection, disadvantageously preventing a stable supporting state from being achieved.

An object of the present invention is to provide a fuel cell module requiring only a small number of molding processes and having favorable productivity, a fuel cell using the fuel cell module, and a method of manufacturing the fuel cell module.

Another object of the present invention is to provide a method of manufacturing a fuel cell module requiring only a small number of molding processes and having favorable workability and capable of attaining a stable supporting state of a polymer electrolyte membrane.

DISCLOSURE OF THE INVENTION

A fuel cell module according to a first aspect of the present invention is a fuel cell module in which the edge of a polymer electrolyte membrane is supported by a frame body, wherein the frame body is made up of one frame and another frame joined so as to sandwich the edge of the polymer electrolyte membrane therebetween, and the other frame is formed of a resin material having a smaller Young's modulus than the one frame and a seal section made from the same material as the other frame is formed on a surface opposite to the joint surface of the one frame with the other frame.

A fuel cell module according to a second aspect of the present invention is the fuel cell module according to the first aspect of the present invention, wherein an aperture from which is exposed the polymer electrolyte membrane is formed in the other frame.

A fuel cell according to a third aspect of the present invention is a stack with a layered structure including the plurality of fuel cell modules according to the first or second aspect of the present invention connected in series, wherein the stack is arranged so that a fuel gas and an oxidant gas are supplied to an anode electrode (fuel electrode) and a cathode electrode (oxidant electrode) of each fuel cell module.

A method of manufacturing a fuel cell module in which the edge of a polymer electrolyte membrane is supported by a frame body according to a fourth aspect of the present invention includes: placing the edge of the polymer electrolyte membrane exposed at the outer periphery of an electrode section, which is formed by providing an anode electrode (fuel electrode) and a cathode electrode (oxidant electrode) on the polymer electrolyte membrane, on the upper surface of one frame that makes up the frame body; and molding another frame that makes up the frame body on the upper surface of the one frame by injecting a resin material having a smaller Young's modulus than the one frame, and simultaneously molding a seal section made from the same material as the other frame on the lower surface of the one frame.

A method of manufacturing a fuel cell module in which the edge of a polymer electrolyte membrane is supported by a frame body according to a fifth aspect of the present invention includes: placing the edge of the polymer electrolyte membrane exposed at the outer periphery of an electrode section, which is formed by providing an anode electrode (fuel electrode) and a cathode electrode (oxidant electrode) on the polymer electrolyte membrane, on the upper surface of one frame that makes up the frame body; and molding another frame that makes up the frame body on the upper surface of the one frame by injecting a resin material having a smaller Young's modulus than the one frame while pressing the edge of the polymer electrolyte membrane against the upper surface of the one frame with a pressing member, and simultaneously molding a seal section made from the same material as the other frame on the lower surface of the one frame.

A method of manufacturing a fuel cell module according to a sixth aspect of the present invention is the method of manufacturing a fuel cell module according to the fourth or fifth aspect of the present invention, wherein an olefinic resin material is injected to form the one frame, and an olefinic elastomer resin material whose Young's modulus is smaller than the one frame is injected to form a seal section on the lower surfaces of the other frame and the one frame.

A fuel cell module according to a seventh aspect of the present invention is the fuel cell module according to the first aspect of the present invention, wherein a penetrating hole connecting both surfaces of the one frame is formed on the one frame, and the other frame and the seal section are connected by a resin material filled into the penetrating hole.

A method of manufacturing a fuel cell module according to an eighth aspect of the present invention is the method of manufacturing a fuel cell module according to the fourth aspect of the present invention, wherein when molding the other frame by injecting the resin material on the upper surface of the one frame, the resin material is injected to a surface opposite to the other frame via a penetrating hole formed on the one frame so as to mold the seal section.

According to the configuration described above, a fuel cell module can be realized which is capable of attaining a stable supporting state of a polymer electrolyte membrane. In addition, since a resin material having a Young's modulus smaller than one frame is injected to the upper surface of the one frame to mold another frame and, at the same time, a seal section made of the same material as the other frame is molded on the lower surface of the one frame, a fuel cell module can be created through a small number of processes.

BEST MODE FOR CARRYING OUT THE INVENTION

A method of manufacturing a fuel cell module according to the present invention will now be described based on respective specific embodiments.

First Embodiment

Figure 1:
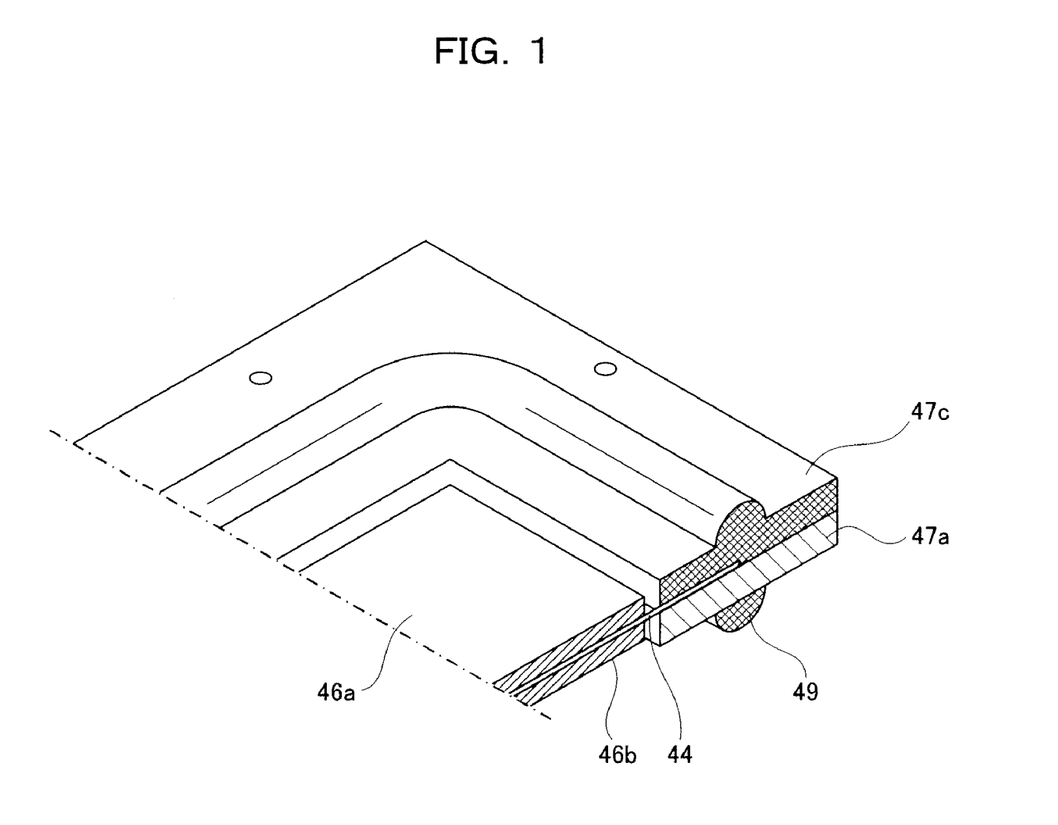
FIG. 1 is an enlarged cross-sectional view of a substantial part of a fuel cell module according to a first embodiment of the present invention.

FIGS. 1 and 2 show the first embodiment of the present invention.

Moreover, components achieving similar effects as the components shown in FIGS. 7 to 10 shall be described by assigning the same reference characters.

The fuel cell module is manufactured through processes shown in FIGS. 2A to 2D.

Figure 2A:
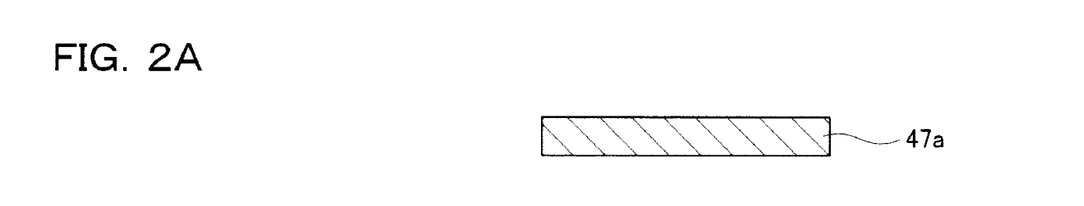
FIGS. 2A to 2D are manufacturing process diagrams according to the first embodiment.

In a frame body primary molding process shown in FIG. 2A, one frame 47a to become a part of the frame body 45 is molded from an olefinic synthetic resin such as polypropylene.

Figure 2B:
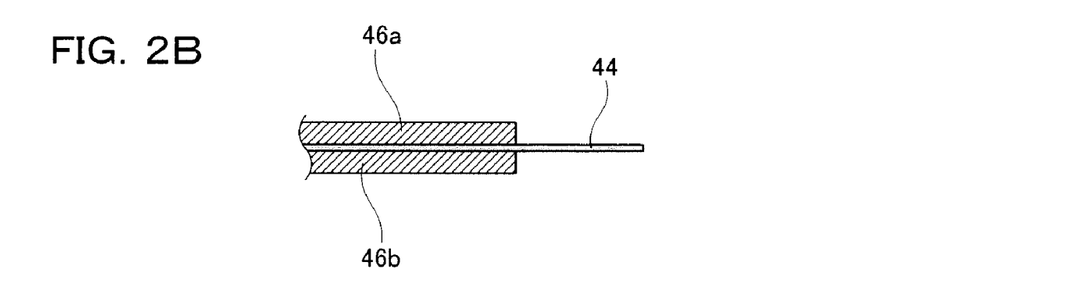

In FIG. 2B, an electrode section is formed by providing an anode electrode (fuel electrode) 46a and a cathode electrode (oxidant electrode) 46b on a polymer electrolyte membrane 44.

Figure 2C:
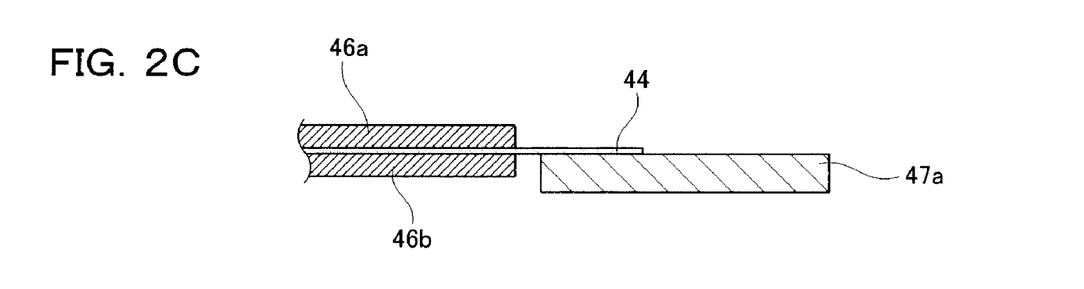
Figure 2D:
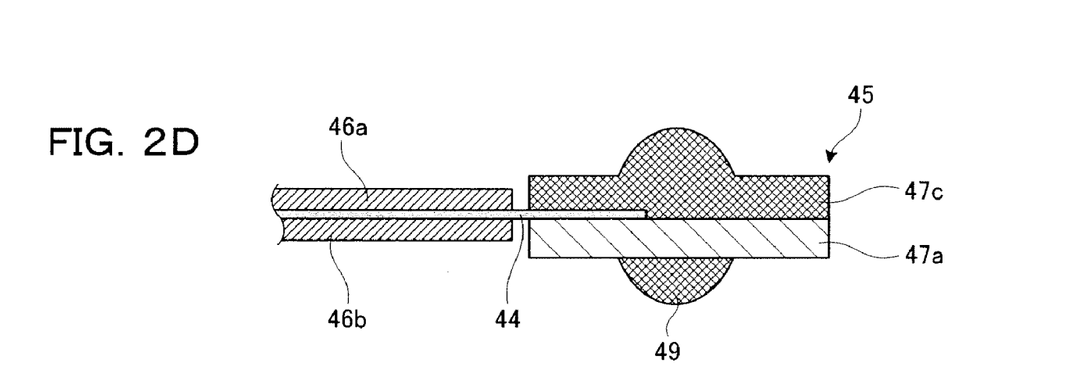

In FIGS. 2C and 2D, the edge of the polymer electrolyte membrane 44 exposed to the outer periphery of the electrode section is placed on the upper surface of the one frame 47a and set in a die (not shown), whereby an olefinic elastomer as a resin material with a Young's modulus smaller than the one frame 47a is injected into the die.

Molding using the die will now be described in detail.

In this case, Prime Polypro (a product of Prime Polymer Co., Ltd.) grade R-250G or R-350G is used as the one frame 47a.

An olefinic elastomer such as Milastomer™ M3800 by Mitsui Chemicals, Inc. or Zelas™ MC616 by Mitsubishi Chemical Corporation is injected as a resin material with a Young's modulus smaller than the one frame 47a into the die to mold another frame 47c to become a part of the frame body 45. The one frame 47a and the other frame 47c hold the polymer electrolyte membrane 44. In addition, the resin used to mold the other frame 47c is supplied to the lower surface of the one frame 47a to simultaneously mold a protrusion 49 as a seal section.

An electrolyte membrane electrode assembly 42 created in this matter is centrally-placed and sandwiched between two separators 43a and 43b. A channel for a fuel gas A is formed between the separator 43a and the anode electrode (fuel electrode) 46a and a channel for an oxygen-containing gas B is formed between the separator 43b and the cathode electrode (oxidant electrode) 46b. A fuel cell can be configured by supplying, in a stack 30 having a layered structure in which the plurality of fuel cell modules are connected in series, a fuel gas and an oxidation gas to the anode electrode 46a and the cathode electrode 46b of each fuel cell module.

According to this configuration, a fuel cell module can be created through a smaller number of processes as compared to the comparative example shown in FIG. 9.

Second Embodiment

Figure 3:
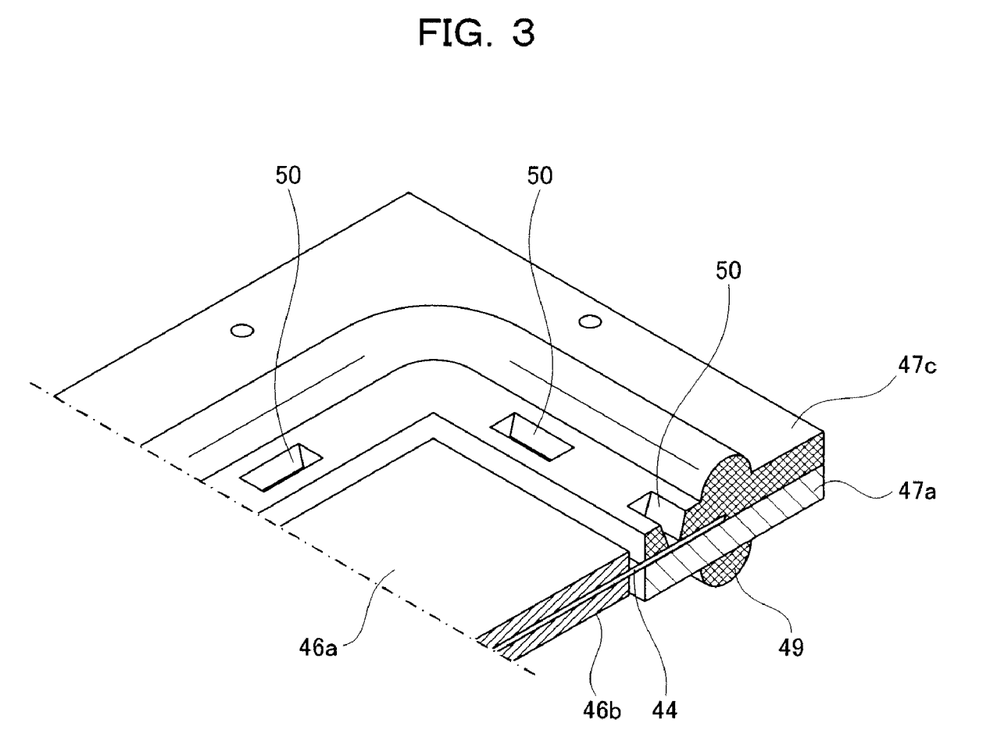
FIG. 3 is an enlarged cross-sectional view of a substantial part of a fuel cell module according to a second embodiment of the present invention.

FIGS. 3 and 4 show the second embodiment of the present invention.

FIG. 3 differs from FIG. 1 of the first embodiment in that an aperture 50 from which is exposed a polymer electrolyte membrane 44 is formed in another frame 47c. For the rest, the second embodiment is the same as the first embodiment.

The aperture 50 is useful in the manufacturing process of a fuel cell module as shown in FIG. 4.

Figure 4A:
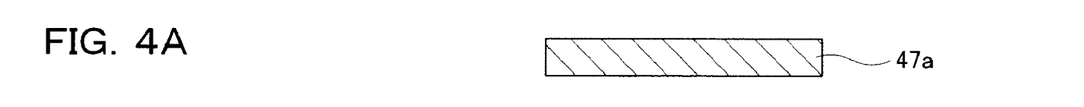
FIGS. 4A to 4E are manufacturing process diagrams according to the second embodiment.

In a frame body primary molding process shown in FIG. 4A, one frame 47a to become a part of the frame body 45 is molded from an olefinic synthetic resin such as polypropylene.

Figure 4B:
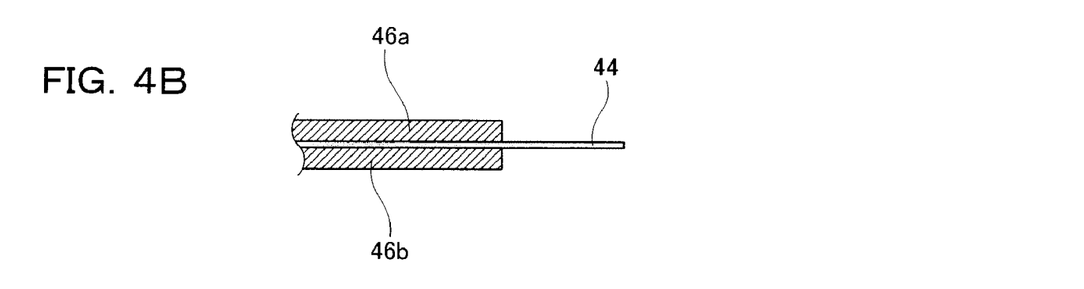

In FIG. 4B, an electrode section is formed by providing an anode electrode (fuel electrode) 46a and a cathode electrode (oxidant electrode) 46b on the polymer electrolyte membrane 44.

Figure 4C:
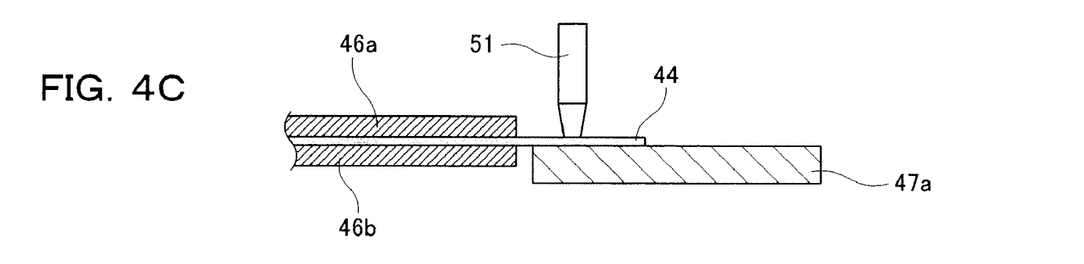

In a state where the electrode section is set in a die (not shown), as shown in FIG. 4C, the edge of the polymer electrolyte membrane 44 is pressed against the upper surface of the one frame 47a by a pressing member 51 having a distal end that is thinner than a proximal end.

Figure 4D:
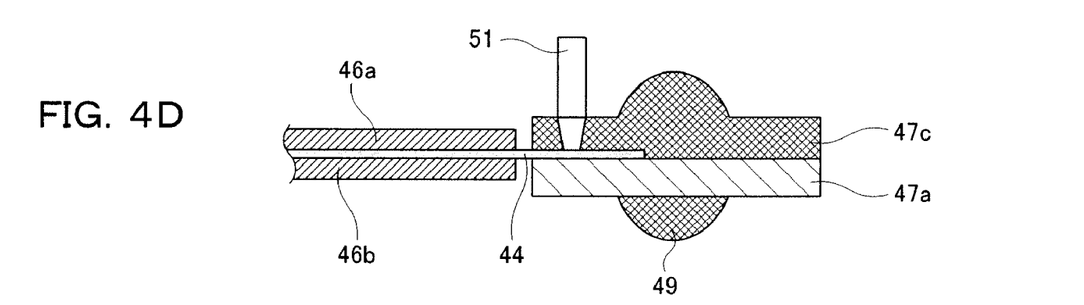

After entering this state, when Prime Polypro (a product of Prime Polymer Co., Ltd.) grade R-250G or R-350G is used as the resin material of the one frame 47a, an olefinic elastomer such as Milastomer™ M3800 by Mitsui Chemicals, Inc. or Zelas™ MC616 by Mitsubishi Chemical Corporation is injected as a resin material with a Young's modulus smaller than the one frame 47a in order to mold another frame 47c to become a part of the frame body 45. The one frame 47a and the other frame 47c hold the polymer electrolyte membrane 44. In addition, the resin used to mold the other frame 47c is supplied to the lower surface of the one frame 47a to simultaneously mold a protrusion 49 as a seal section.

Figure 4E:
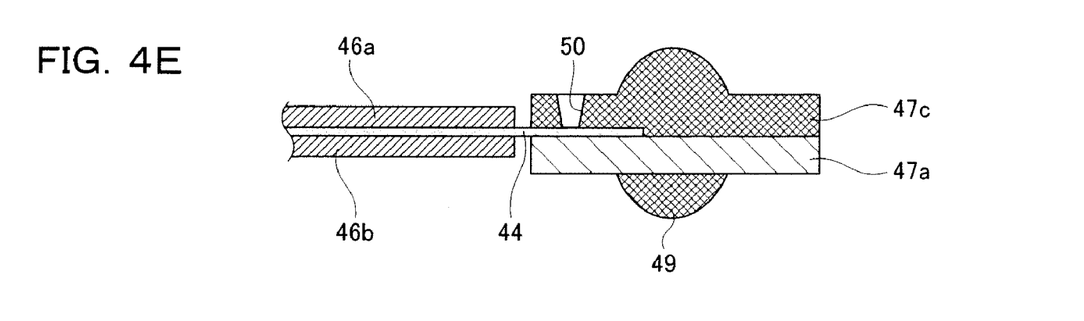

Once the resin of the other frame 47c and the seal section 49 cures and the die is opened to eject a product, an electrolyte membrane electrode assembly 42 having the aperture 50 is completed as shown in FIG. 4E.

The electrolyte membrane electrode assembly 42 created in this matter is centrally-placed and sandwiched between two separators 43a and 43b. A channel for a fuel gas A is formed between the separator 43a and the anode electrode (fuel electrode) 46a and a channel for an oxygen-containing gas B is formed between the separator 43b and the cathode electrode (oxidant electrode) 46b. A fuel cell can be configured by supplying, in a stack 30 having a layered structure in which the plurality of fuel cell modules are connected in series, a fuel gas and an oxidation gas to the anode electrode 46a and the cathode electrode 46b of each fuel cell module.

According to this configuration, a fuel cell module can be created through a smaller number of processes as compared to the comparative example shown in FIG. 9. At the same time, since a resin is injected in a state where the edge of the polymer electrolyte membrane 44 is pressed against the upper surface of the upper frame 47a by the pressing member 51, the edge of the polymer electrolyte membrane 44 is no longer deflected by the pressure applied by the resin and a stable supporting state can be achieved.

Third Embodiment

Figure 5A:
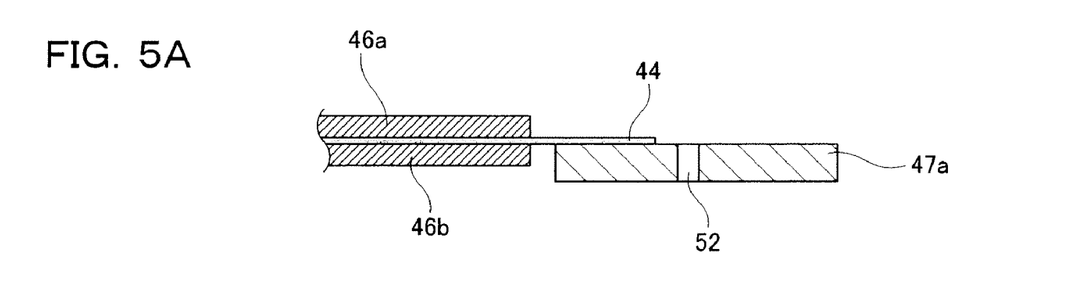
FIGS. 5A and 5B are diagrams showing manufacturing processes for a fuel cell module according to a third embodiment of the present invention.
Figure 5B:
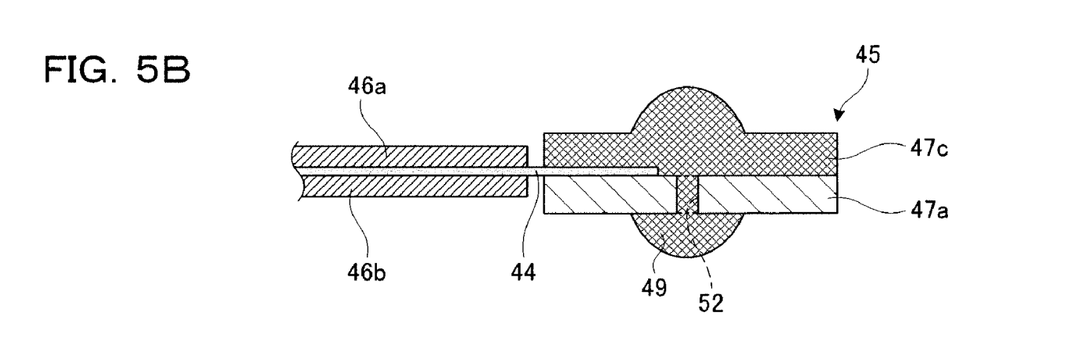

FIG. 5 shows the third embodiment of the present invention.

While another frame 47c and a protrusion 49 have been molded by a resin injected to the upper surface of one frame 47a in the first embodiment shown in FIGS. 1 and 2, by forming on the one frame 47a a penetrating hole 52 connecting both surfaces of the one frame 47a as shown in FIG. 5A, when injecting a resin of the one frame 47a, a portion of the resin is injected to a surface on the opposite side via the penetrating hole 52. As a result, the protrusion 49 can be formed as shown in FIG. 5B. For the rest, the third embodiment is the same as the first embodiment.

According to such a configuration, in addition to the effects of the first embodiment, since the other frame 47c and the protrusion 49 are connected by the resin filled into the penetrating hole 52 of the one frame 47a, an adhesive strength of the protrusion 49 to the one frame 47a can be increased in comparison to the first embodiment.

Fourth Embodiment

Figure 6A:
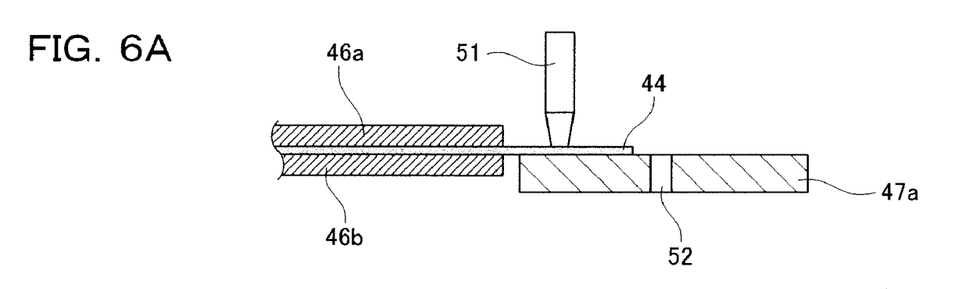
FIGS. 6A to 6C are diagrams showing manufacturing processes for a fuel cell module according to a fourth embodiment of the present invention.
Figure 6B:
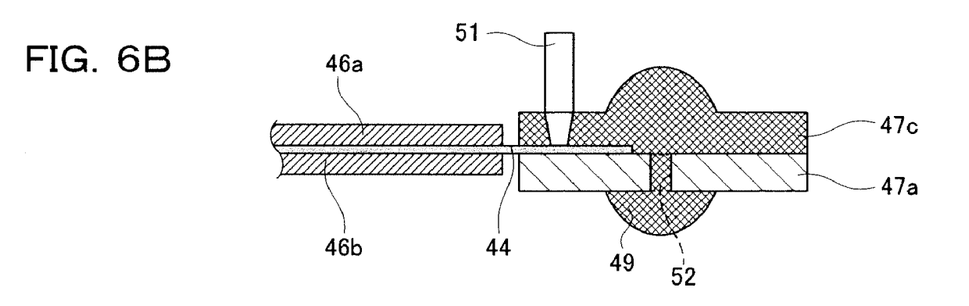
Figure 6C:
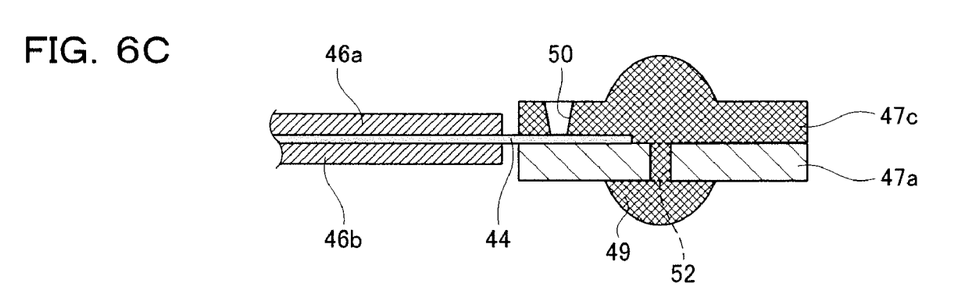

FIG. 6 shows the fourth embodiment of the present invention.

While another frame 47c and a protrusion 49 have been molded by a resin injected to the upper surface of one frame 47a in the second embodiment shown in FIGS. 3 and 4, by forming on the one frame 47a a penetrating hole 52 connecting both surfaces of the one frame 47a as shown in FIG. 6A, when injecting a resin of the one frame 47a, a portion of the resin is injected to a surface on the opposite side via the penetrating hole 52. As a result, the protrusion 49 can be formed as shown in FIGS. 6B and 6C. For the rest, the fourth embodiment is the same as the second embodiment.

According to such a configuration, in addition to the effects of the second embodiment, since the other frame 47c and the protrusion 49 are connected by the resin filled into the penetrating hole 52 of the one frame 47a, an adhesive strength of the protrusion 49 to the one frame 47a can be increased in comparison to the second embodiment.

It should be noted that, in the respective embodiments described above, a condition that the frame 47c is required to satisfy (a condition ensuring that elastic deformation be performed) is to have elasticity of A50 to A90 or D37 to D60 as stipulated by "JISK6253".

A fuel cell having favorable productivity can be achieved by creating a stack 30 with a layered structure in which a plurality of fuel cell modules according to any of the embodiments described above are connected in series and configuring the stack 30 so that a fuel gas and an oxidation gas are supplied to an anode electrode 46a and a cathode electrode 46b of each fuel cell module.

INDUSTRIAL APPLICABILITY

The present invention is capable of creating a fuel cell module used as a component in a polymer electrolyte fuel cell (PEFC) or the like through a small number of molding processes and contributing towards cost reduction in fuel batteries without degrading the performance of the fuel batteries.

The invention claimed is:

1. A fuel cell module comprising a polymer electrolyte membrane, a frame body, and a seal section, wherein:
   an edge of the polymer electrolyte membrane is supported by the frame body;
   the frame body comprises a first frame and a second frame joined to the first frame to sandwich the edge of the polymer electrolyte membrane therebetween;
   the seal section is on a surface of the first frame which does not contact the second frame; and
   the second frame comprises a resin material having a smaller Young's modulus than the first frame, and the seal section comprises the same material as the second frame.

2. The fuel cell module according to claim 1, wherein the polymer electrolyte membrane is exposed through an aperture in the second frame.

3. A fuel cell comprising a stack of a plurality of fuel cell modules according to claim 1, wherein the fuel cell modules are connected in series, and the stack is arranged so that a fuel gas and an oxidant gas may be supplied to an anode electrode and a cathode electrode of each fuel cell module.

4. The fuel cell module according to claim 1, wherein
   a penetrating hole connecting both surfaces of the first frame is formed on the first frame, and the second frame and the seal section are connected by a resin material filled into the penetrating hole.

* * * * *